US010222554B2

(12) United States Patent
Ohara et al.

(10) Patent No.: US 10,222,554 B2
(45) Date of Patent: Mar. 5, 2019

(54) RESIN OPTICAL WAVEGUIDE

(71) Applicant: AGC Inc., Chiyoda-ku (JP)

(72) Inventors: Seiki Ohara, Tokyo (JP); Shotaro Takenobu, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/884,883

(22) Filed: Jan. 31, 2018

(65) Prior Publication Data

US 2018/0156970 A1 Jun. 7, 2018

Related U.S. Application Data

(63) Continuation of application No. PCT/JP2016/072526, filed on Aug. 1, 2016.

(30) Foreign Application Priority Data

Aug. 4, 2015 (JP) ................................ 2015-154011

(51) Int. Cl.
*G02B 6/30* (2006.01)
*G02B 6/12* (2006.01)
(Continued)

(52) U.S. Cl.
CPC ................ *G02B 6/30* (2013.01); *G02B 6/12* (2013.01); *G02B 6/122* (2013.01); *G02B 6/13* (2013.01);
(Continued)

(58) Field of Classification Search
None
See application file for complete search history.

(56) References Cited

U.S. PATENT DOCUMENTS 4,865,407 A * 9/1989 Suzuki ................ G02B 6/1228 385/129
8,724,937 B2 5/2014 Barwicz et al.
(Continued)

FOREIGN PATENT DOCUMENTS

JP 06-034838 2/1994
JP 2002-122750 4/2002
(Continued)

OTHER PUBLICATIONS

English translation of written opinion for PCT/JP2016/072526, dated Oct. 25, 2016.*
(Continued)

*Primary Examiner* — Michael Stahl
(74) *Attorney, Agent, or Firm* — Oblon, McClelland, Maier & Neustadt, L.L.P.

(57) ABSTRACT

A resin optical waveguide containing a core, an under cladding and an over cladding having refractive indices lower than that of the core, in which the resin optical waveguide has, at one end side thereof, a core-exposed section at which the over cladding is not present and the core is exposed and, of the under cladding, a portion corresponding to the core-exposed section has a core-neighboring region that satisfies the following (1) and (2):
(1) the core-neighboring region is a region whose distance from the core is within x, and x is 5 μm or more and 20 μm or less; and
(2) the core-neighboring region has a refractive index distribution that the refractive index at a side of an interface with the core is high and the refractive index at a far side from the interface with the core is low.

12 Claims, 4 Drawing Sheets

(51) Int. Cl.

| | |
|---|---|
| ***G02B 6/122*** | (2006.01) |
| ***G02B 6/26*** | (2006.01) |
| ***G02B 6/13*** | (2006.01) |

(52) U.S. Cl.

CPC ...... *G02B 6/26* (2013.01); *G02B 2006/12061* (2013.01); *G02B 2006/12095* (2013.01); *G02B 2006/12147* (2013.01)

(56) References Cited

U.S. PATENT DOCUMENTS

| | | | | |
|---|---|---|---|---|
| 9,547,129 | B1 * | 1/2017 | Kato | G02B 6/26 |
| 9,588,296 | B2 * | 3/2017 | Heaton | G02B 6/14 |
| 9,759,863 | B1 * | 9/2017 | Peng | G02B 6/0283 |
| 2003/0035633 | A1 * | 2/2003 | Agarwal | G02B 6/1228 385/49 |
| 2005/0129366 | A1 * | 6/2005 | Yasaitis | B82Y 20/00 385/39 |
| 2005/0259935 | A1 * | 11/2005 | Hamada | G02B 6/138 385/129 |
| 2012/0002932 | A1 | 1/2012 | Takenobu et al. | |
| 2013/0064514 | A1 | 3/2013 | Peng | |
| 2013/0114924 | A1 * | 5/2013 | Loh | G02B 6/1245 385/14 |
| 2014/0112616 | A1 | 4/2014 | Numata | |
| 2018/0180806 | A1 * | 6/2018 | Ohara | G02B 6/30 |

FOREIGN PATENT DOCUMENTS

| | | |
|---|---|---|
| JP | 2010-072463 | 4/2010 |
| JP | 2012-063620 | 3/2012 |
| JP | 2013-058300 | 3/2013 |
| JP | 2013-120338 | 6/2013 |
| JP | 2014-081586 | 5/2014 |
| WO | 2010/107005 | 9/2010 |

OTHER PUBLICATIONS

International Search Report dated Oct. 25, 2016 in PCT/JP2016/072526 filed Aug. 1, 2016 (with English Translation).

Written Opinion dated Oct. 25, 2016 in PCT/JP2016/072526 filed Aug. 1, 2016.

Jie Shu, et al., "Efficient coupler between chip-level and board-level optical waveguides," Optics Letters, vol. 36, No. 18, Sep. 2011, pp. 3614-3616.

Tymon Barwicz, et al., "Low-Cost Interfacing of Fibers to Nanophotonic Waveguides: Design for Fabrication and Assembly Tolerances," IEEE Photonics Journal vol. 6, No. 4, Aug. 2014, 19 Pages.

* cited by examiner

[FIG. 1]
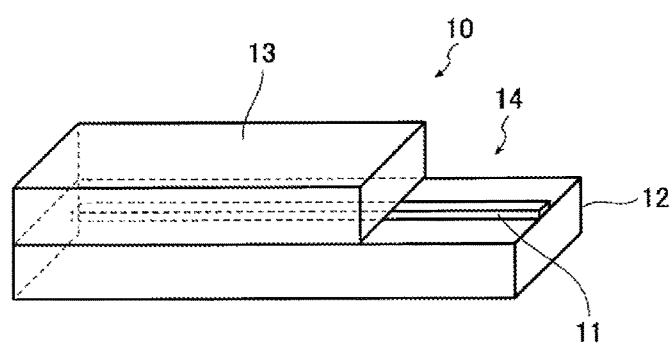
[FIG. 2]
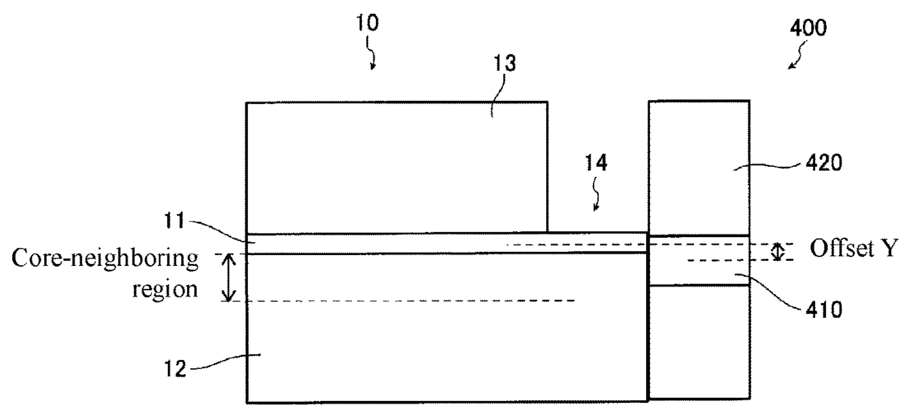

[FIG. 3]
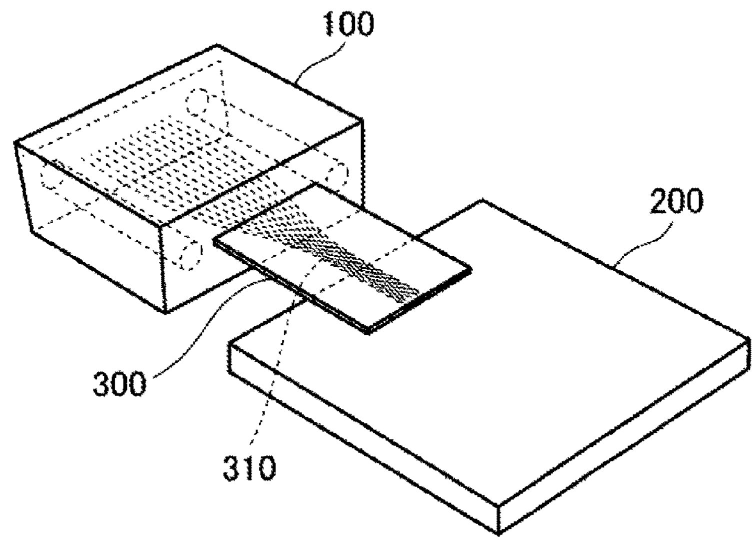
[FIG. 4]
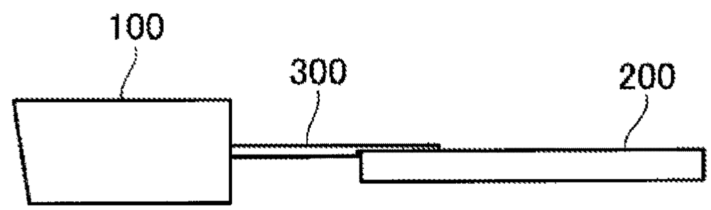
[FIG. 5]
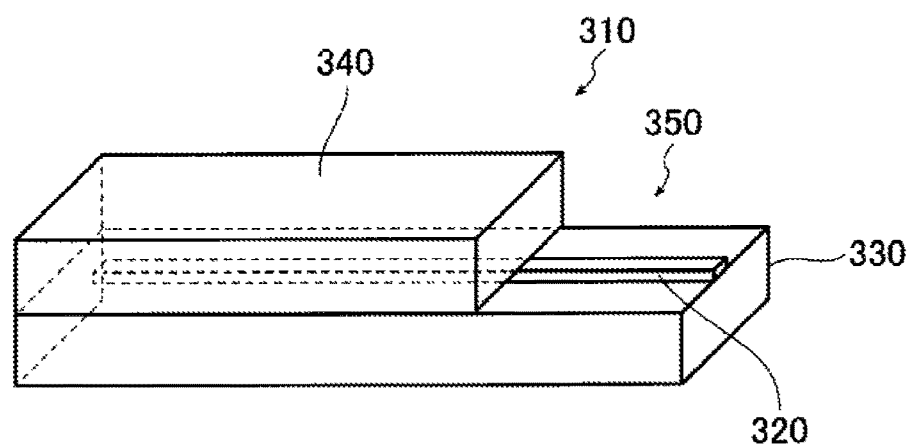

[FIG. 6]
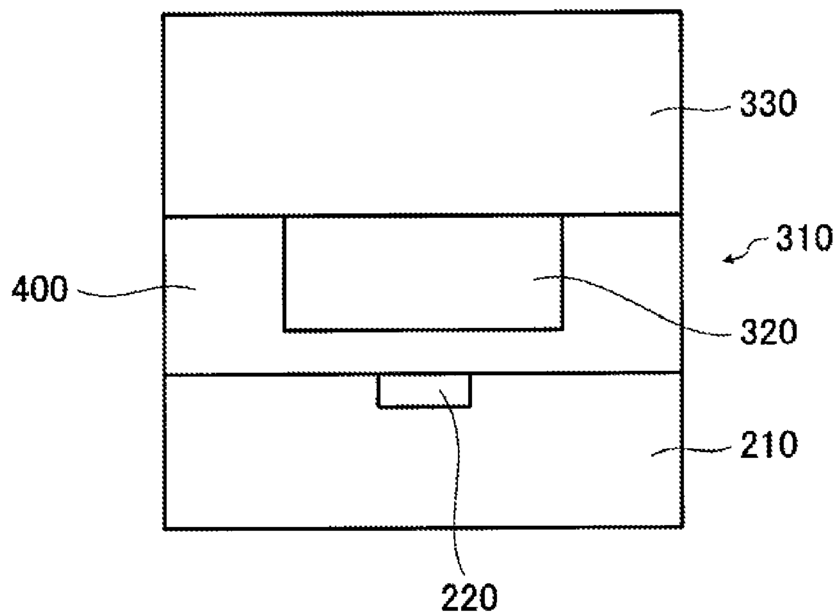
[FIG. 7]
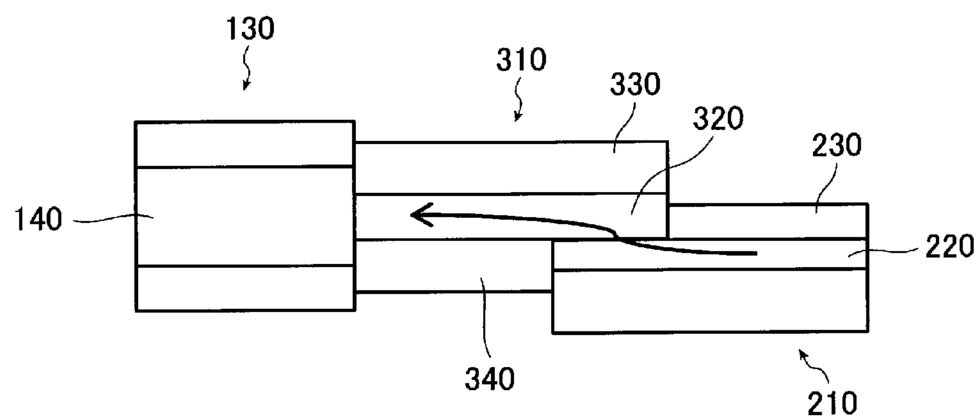

[FIG. 8]
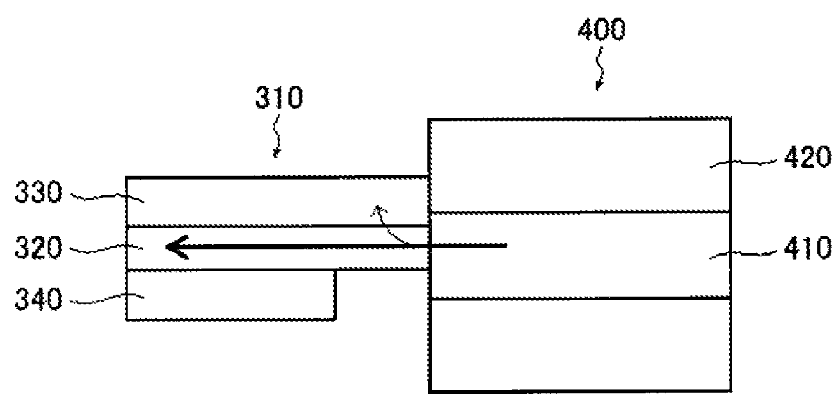

RESIN OPTICAL WAVEGUIDE

TECHNICAL FIELD

The present invention relates to a resin optical waveguide.

BACKGROUND ART

Non-Patent Documents 1 and 2 and Patent Document 1 propose a silicon photonics interface in which a silicon optical waveguide is connected to a resin optical waveguide with low loss and at low cost. The silicon optical waveguide referred to in the present Description has a core-clad structure that functions as a (single-mode) optical waveguide formed on a silicon chip.

FIG. 3 is a perspective view illustrating a configuration example of such a silicon photonics interface and FIG. 4 is a side view thereof.

In a resin optical waveguide chip 300 illustrated in FIGS. 3 and 4, one or a plurality of resin optical waveguides 310 are formed. At one end side of the resin optical waveguide chip 300, the resin optical waveguide(s) 310 is(are) connected to a silicon optical waveguide (not illustrated) formed on a silicon optical waveguide chip 200. Another end side of the resin optical waveguide chip 300 is housed in a connector 100.

FIG. 5 is a perspective view illustrating a configuration example of the resin optical waveguide to be used for the above purpose.

The resin optical waveguide 310 illustrated in FIG. 5 has an under cladding 330 and an over cladding 340 provided around a core 320. However, the tip of the side with which the silicon optical waveguide (not illustrated) formed on the silicon optical waveguide chip 200 is to be connected in FIGS. 3 and 4 has no over cladding 340 provided, and forms a core-exposed section 350 where the core 320 is exposed to the outside.

FIG. 6 is a cross-sectional view illustrating a connecting part between the silicon optical waveguide 210 and the resin optical waveguide 310 in the silicon photonics interface illustrated in FIGS. 3 and 4. The resin optical waveguide 310 is the resin optical waveguide 310 illustrated in FIG. 5. In FIG. 6, the silicon optical waveguide 210 and the resin optical waveguide 310 are connected by using an epoxy resin in a state that the core 320 of the resin optical waveguide 310 faces to the silicon optical waveguide 210.

FIG. 7 is a schematic view for explaining light propagation in the silicon photonics interface illustrated in FIGS. 3 and 4. In FIG. 7, light is propagated from a core 220 of the silicon optical waveguide 210 to the core 320 exposed at the tip of the resin optical waveguide 310 by adiabatic coupling. Then, the light is propagated from the core 320 of the resin optical waveguide 310 to a core 140 of an optical fiber 130.

PRIOR ART DOCUMENT

Non-Patent Document

Non-Patent Document 1: Jie Shu, Ciyuan Qiu, Xuezhi Zhang, and Qianfan Xu, "Efficient coupler between chip-level and board-level optical waveguides", OPTICS LETTERS, Vol. 36. No. 18, pp 3614-3616 (2011)

Non-Patent Document 2: Tymon Barwics, and Yoichi Taira, "Low-Cost Interfacing of Fibers to Nanophotonic Waveguides: Design for Fabrication and Assembly Toleranes", IEEE Photonics Journal, Vol. 6, No. 4, August, 660818 (2014)

Patent Document

Patent Document 1: U.S. Pat. No. 8,724,937

SUMMARY OF THE INVENTION

Problems that the Invention is to Solve

The resin optical waveguide 310 illustrated in FIG. 5 is subjected to performance evaluation with the same procedure as in the case of conventional resin optical waveguide before being mounted on the silicon photonics interface illustrated in FIGS. 3 and 4. In the performance evaluation of the resin optical waveguide, a single-mode optical fiber is connected to a tip of the resin optical waveguide. FIG. 8 is a schematic view for explaining light propagation in the case where a single-mode optical fiber is connected to a tip of the resin optical waveguide 310 illustrated in FIG. 5. In the connection of the resin optical waveguide 310 illustrated in FIG. 5 and the single-mode optical fiber 400, a part of the light is emitted from the portion at which the core 320 at the tip of the resin optical waveguide 310 is exposed and is not propagated, and also there is a problem where connection loss occurs. This connection loss does not occur at the time of mounting on the silicon photonics interface illustrated in FIGS. 3 and 4 and thus, lowers the reliability of the results of the performance evaluation.

In order to solve the problems of the conventional art described above, an object of the present invention is to provide a resin optical waveguide which is suitable for the use in the silicon photonics interface that connects a silicon optical waveguide and the resin optical waveguide with low loss and at low cost, and which exhibits high reliability of performance evaluation using a single-mode optical fiber.

Means for Solving the Problems

In order to achieve the object described above, the present invention provides a resin optical waveguide containing a core, an under cladding having a refractive index lower than that of the core, and an over cladding, in which the resin optical waveguide has, at one end side thereof, a core-exposed section at which the over cladding is not present and the core is exposed and, of the under cladding, a portion corresponding to the core-exposed section has a core-neighboring region that satisfies the following (1) and (2):

(1) the core-neighboring region is a region whose distance from the core is within x, and x is 5 μm or more and 20 μm or less; and (2) the core-neighboring region has a refractive index distribution that the refractive index at a side of an interface with the core is high and the refractive index at a far side from the interface with the core is low.

In the resin optical waveguide of the present invention, the core-exposed section has a length of preferably 100 μm or more in a light propagation direction.

In the resin optical waveguide of the present invention, the refractive index distribution in the core-neighboring region is preferably 0.00004/μm or more.

The resin optical waveguide of the present invention preferably has a difference ($n_{max}-n_{min}$) between the maximum value $n_{max}$ and the minimum value $n_{min}$ of the refractive index of the under cladding in the core-neighboring region being 0.0001 or more.

The resin optical waveguide of the present invention preferably has a difference ($n'_{max}-n_{max}$) between the maximum value $n'_{max}$ of the refractive index of the core and the maximum value $n_{max}$ of the refractive index of the under cladding in the core-neighboring region being from 0.008 to 0.02.

In the resin optical waveguide of the present invention, of the portion of the under cladding corresponding to the core-exposed section, a portion other than the core-neighboring region preferably has a refractive index being equal to or less than the minimum value $n_{min}$ of the refractive index of the under cladding in the core-neighboring region.

In the resin optical waveguide of the present invention, the under cladding has a thickness of preferably 10 μm or more.

The resin optical waveguide of the present invention is preferably a single-mode optical waveguide at a wavelength of at least one of 1,310 nm and 1,550 nm.

In the resin optical waveguide of the present invention, the resin optical waveguide has a core size of preferably from 1 to 10 μm.

In the resin optical waveguide of the present invention, the core of the resin optical waveguide is preferably composed of a resin containing fluorine.

Moreover, the present invention provides a resin optical waveguide containing a core, an under cladding and an over cladding having refractive indices lower than that of the core, in which the resin optical waveguide has, at one end side thereof, a core-exposed section at which the over cladding is not present and the core and the under cladding adjacent to the core are exposed, and the core-exposed section has a length of 500 μm or more in a light propagation direction of the resin optical waveguide, and of the under cladding, a portion corresponding to the core-exposed section has a core-neighboring region that satisfies the following (1) to (3):

(1) the core-neighboring region is a region whose distance from the core is within x, and x is 10 μm or more and 20 μm or less;

(2) the core-neighboring region has a refractive index distribution that the refractive index at a side of an interface with the core is high and the refractive index at a far side from the interface with the core is low; and (3) a difference ($n_{max}-n_{min}$) between the maximum value $n_{max}$ and the minimum value $n_{min}$ of the refractive index of the under cladding in the core-neighboring region is 0.001 or more.

The resin optical waveguide of the present invention is preferably connected with a silicon optical waveguide at the core-exposed section.

Advantageous Effect of the Invention

The resin optical waveguide of the present invention is suitable for the use in a silicon photonics interface in which a silicon optical waveguide is connected to a resin optical waveguide with low loss and at low cost.

The resin optical waveguide of the present invention exhibits low connection loss during performance evaluation using a single-mode optical fiber and thus the performance evaluation is highly reliable.

BRIEF DESCRIPTION OF DRAWINGS

FIG. 1 is a perspective view illustrating a configuration example of the resin optical waveguide of the present invention.

FIG. 2 is a schematic view illustrating a connecting part between a resin optical waveguide and a single-mode optical fiber in Examples.

FIG. 3 is a perspective view illustrating a configuration example of a silicon photonics interface.

FIG. 4 is a side view of the silicon photonics interface of FIG. 3.

FIG. 5 is a perspective view illustrating a configuration example of the resin optical waveguide for use in the silicon photonics interface of FIGS. 3 and 4.

FIG. 6 is a cross-sectional view illustrating a connecting part between a silicon optical waveguide and a resin optical waveguide 310 formed on a silicon optical waveguide chip 200 in the silicon photonics interface illustrated in FIGS. 3 and 4.

FIG. 7 is a schematic view for explaining light propagation in the silicon photonics interface illustrated in FIGS. 3 and 4.

FIG. 8 is a schematic view for explaining light propagation when a single-mode optical fiber is connected to the tip of the resin optical waveguide 310 illustrated in FIG. 5.

MODE FOR CARRYING OUT THE INVENTION

The following will explain the present invention with reference to Drawings.

FIG. 1 is a perspective view illustrating a configuration example of the resin optical waveguide of the present invention. The resin optical waveguide 10 illustrated in FIG. 1 contains a core 11, an under cladding 12 having a refractive index lower than that of the core 11 and an over cladding 13. The under cladding 12 is provided under the core 11 and the over cladding 13 is provided over the core 11. However, a core-exposed section 14 at which the over cladding 13 is not present and the core 11 is exposed is provided at one end side of the resin optical waveguide 10.

In the resin optical waveguide of the present invention, of the under cladding and over cladding provided around the core, the one that is not present at the core-exposed section is regarded as the over cladding. Therefore, the under cladding may be provided over the core and the over cladding may be provided under the core.

The core-exposed section 14 is to be a connecting portion with a silicon optical waveguide when the resin optical waveguide 10 is used in a silicon photonics interface. Therefore, the core-exposed section 14 is required to have a sufficient length for the use as the connecting portion with the silicon optical waveguide. In the resin optical waveguide 10 of the present invention, the length of the core-exposed section 14 in a light propagation direction of the resin optical waveguide is preferably 100 μm or more, which is a sufficient length for the use as the connecting portion with the silicon optical waveguide. Incidentally, the light propagation direction of the resin optical waveguide is the long axis direction of the core 11.

In the core-exposed section 14, the length in the light propagation direction of the resin optical waveguide is more preferably 300 μm or more, further preferably 500 μm or more, and even further preferably 1,000 μm or more.

However, in the case where the length of the core-exposed section 14 in the light propagation direction of the resin optical waveguide is too long, there is a concern that the connection loss may increase when connecting with a silicon optical waveguide by using an adhesive (e.g., an epoxy resin), due to absorption of the adhesive. Therefore, the length of the core-exposed section 14 in the light propagation direction of the resin optical waveguide is preferably 10,000 μm or less, more preferably 5,000 μm or less, and further preferably 3,000 μm or less.

In the resin optical waveguide 10, the refractive indices of the under cladding 12 and the over cladding 13 are made lower than that of the core 11 for preventing the light propagated through the core 11 from emitting to the under cladding 12 side or to the over cladding 13 side.

As mentioned above, when the resin optical waveguide 310 having the core-exposed section is connected to the single-mode optical fiber 400 as illustrated in FIG. 8, the core 320 is in an exposed state at the core-exposed section where the over cladding 340 is not present. Since the performance evaluation of the resin optical waveguide 310 is performed under a condition that the core-exposed section is present in air or in water, the exposed surface of the core 320 comes into contact with air or water. But air or water has a refractive index smaller than those of the materials of the core 320 and the under cladding 330 of the resin optical waveguide 310. As a result, a part of the light propagated through the core 320 is emitted to the under cladding 330 side, which is a cause of the connection loss.

In the resin optical waveguide 10 of the present invention, of the under cladding 12, the portion corresponding to the core-exposed section 14 has a core-neighboring region, which satisfies the following (1) and (2). Therefore, the connection loss at the time of connection with a single-mode optical fiber is suppressed:

(1) the core-neighboring region is a region whose distance from the core 11 is within x, and x is 5 μm or more and 20 μm or less;

(2) the core-neighboring region has a refractive index distribution that the refractive index at the side of the interface with the core 11 is high and the refractive index at the far side from the interface with the core 11 is low.

In the case where the core-neighboring region has the refractive index distribution that the refractive index at the near side to the core 11 is higher and the refractive index at the far side from the core 11 is lower, in the core-exposed section 14, the emission of the light propagated through the core 11 to the under cladding 12 side is suppressed and thus the connection loss at the time of the connection with a single-mode optical fiber is suppressed. Incidentally, the refractive index distribution in the above (2) is generated by continuously decreasing the refractive index from the side of the interface with the core 11 toward the far side with respect to the interface with the core 11.

Here, in the case where the distance of the core-neighboring region from the core 11 is determined to be within x and x is controlled to 5 μm or more, in the core-exposed section 14, the emission of the light propagated through the core 11 to the under cladding 12 side is suppressed. The upper limit of x is determined as 20 μm because even when the aforementioned refractive index distribution is provided at the region whose distance from the core 11 is 20 μm or more, only small contribution to the effect of suppressing the connection loss at the time of the connection with a single-mode optical fiber is obtained.

In the resin optical waveguide 10 of the present invention, the refractive index distribution in the core-neighboring region is preferably 0.00004/μm or more in view of the aforementioned effect of suppressing the connection loss at the time of the connection with a single-mode optical fiber.

The refractive index distribution in the core-neighboring region is preferably 0.00007/μm or more, more preferably 0.000075/μm or more, further preferably 0.0001/μm or more, and particularly preferably 0.0002/μm or more.

Incidentally, an upper limit value of the refractive index distribution is not particularly limited but, for example, may be set to 0.00035 owing to the production method or the like to be mentioned later.

With regard to the refractive index of the under cladding 12 in the core-neighboring region, the refractive index at the near side to the core 11 is the maximum value $n_{max}$ and the refractive index at the far side from the core 11 is the minimum value $n_{min}$. The difference ($n_{max}-n_{min}$) between the maximum value $n_{max}$ and the minimum value $n_{min}$ of the refractive index of the under cladding 12 in the core-neighboring region is preferably 0.0001 or more, in view of suppressing the connection loss at the time of the connection with a single-mode optical fiber. The difference is more preferably 0.0002 or more, further preferably 0.0004 or more, and particularly preferably 0.0008 or more.

Incidentally, an upper limit value of the difference between the maximum value $n_{max}$ and the minimum value $n_{min}$ of the refractive index is not particularly limited but, for example, may be set to 0.0035 owing to the production method or the like to be mentioned later.

In view of achieving both of the suppression of the connection loss with a silicone optical waveguide and the suppression of the connection loss at the time of the connection with a single-mode optical fiber, the difference ($n'_{max}-n_{max}$) between the maximum value $n'_{max}$ of the refractive index of the core 11 and the maximum value $n_{max}$ of the refractive index of the under cladding 12 in the core-neighboring region is preferably from 0.008 to 0.02. Here, The maximum value $n'_{max}$ of the refractive index of the core 11 is used because a case where refractive index distribution is present also in the core 11 is considered.

$n'_{max}-n_{max}$ is more preferably from 0.010 to 0.015.

In the resin optical waveguide of the present invention, of the portion of the under cladding 12 corresponding to the core-exposed section, the portion other than the core-neighboring region preferably has a refractive index being equal to or less than the minimum value $n_{min}$ of the refractive index of the under cladding 12 in the core-neighboring region, in view of suppressing the connection loss at the time of the connection with a single-mode optical fiber. The refractive index of the under cladding 12 other than the core-neighboring region is not particularly limited as long as it is the minimum value $n_{min}$ or less. Therefore, the portion other than the core-neighboring region may have a refractive index of an equal numerical value as a whole, or may have a refractive index distribution that the refractive index further decreases toward the far side with respect to the core 11 as in the case of the core-neighboring region.

In the resin optical waveguide of the present invention, depending on the thickness of the under cladding 12, the whole portion of the under cladding 12 corresponding to the core-exposed section may be the core-neighboring region which satisfies the above (1) and (2), preferably the above (1) to (3). In this case, the thickness of the under cladding 12 coincides with the above x.

In the resin optical waveguide of the present invention, the refractive index of the under cladding 12 at the portion where the over cladding 13 and the under cladding 12 are provided over and under the core 11 is not particularly limited as long as the refractive index is a numerical value lower than the refractive index of the core 11 in all regions including the core-neighboring region. Therefore, for example, the under cladding 12 at the portion may have a refractive index of an equal numerical value as a whole, or may have a refractive index distribution that the refractive index decreases toward the far side with respect to the core 11. Moreover, the portion may have the same region as the core-neighboring region, which satisfies the above (1) to (3).

The resin optical waveguide of the present invention will be further described.

Core 11

In the resin optical waveguide 10 illustrated in FIG. 1, the cross-sectional shape of the core 11 is rectangular, but the shape is not limited thereto and may be, for example, trapezoidal, circular or elliptic. In the case where the cross-sectional shape of the core 11 is polygonal, the corners may be rounded.

The core size is not particularly limited and can be appropriately designed in consideration of a light source, coupling efficiency with a light receiving element, or the like. The coupling efficiency depends on the core diameter and the numerical aperture (NA). For example, the core size (in the case where the cross-sectional shape of the core 11 is rectangular as in the case of the core 11 illustrated in FIG. 1, width and height of the rectangle) of the core 11 is preferably from 1 to 10 μm in terms of the coupling efficiency with a silicon optical waveguide to be connected at the time of the use in a silicon photonics interface. The core size is more preferably from 1.5 to 8 μm and further preferably from 2 to 7 μm. Here, the width of the rectangle is the length of the width at the central position of the height and the height of the rectangle is the length of the height at the central position of the width. Incidentally, the core size may change in a tapered manner along the light propagation direction of the resin optical waveguide.

The core 11 may have such refractive index distribution that the refractive index decreases toward the far side with respect to the center of the core. Also, the core may have such refractive index distribution that the refractive index at the over cladding side is higher and the refractive index at the under cladding side is lower or such refractive index distribution that the refractive index at the over cladding side is lower and the refractive index at the under cladding side is higher.

Over Cladding 13

The refractive index of the over cladding 13 is not particularly limited as long as the numerical value is lower than the refractive index of the core 11. Therefore, for example, the over cladding 13 may have a refractive index of an equal numerical value as a whole, or may have a configuration where the refractive index decreases toward the far side with respect to the core 11 or may have a configuration where the refractive index increases toward the far side with respect to the core 11.

The thickness of the over cladding 13 is not particularly limited. However, in the case where the resin optical waveguide 10 of the present invention is a single-mode optical waveguide, a propagated light may leak also to the clad part existing within the range of about 10 μm from the center of the core 11. Therefore, in the case of a single-mode optical waveguide, the thickness is preferably 10 μm or more from the viewpoint of decreasing the propagation loss of light. Moreover, the total thickness of the under cladding 12 and the over cladding 13 is preferably from 20 to 90 μm and more preferably from 30 to 70 μm.

In the resin optical waveguide of the present invention, constituting materials of the core 11, the under cladding 12, and the over cladding 13 are not particularly limited as long as they satisfy the required properties as the resin optical waveguide. In view of suppressing the loss of the light propagated through the core 11, the constituting material of the core 11 is preferably a resin containing fluorine.

Moreover, with regard to the constituting materials of the core 11, the under cladding 12 and the over cladding 13 and the production procedures of the resin optical waveguide, for example, the descriptions in the following literatures can be referenced.

WO 2010/107005

JP-A-2013-120338

JP-A-2012-063620

In the case where the resin optical waveguide 10 of the present invention illustrated in FIG. 1 is produced with reference to the above literatures, the core-exposed section 14 of the resin optical waveguide 10 can be formed by the following procedure.

An under cladding is formed and a core is formed on the under cladding by using a photolithography process. And then, a curable composition is applied on the under cladding and the core and the curable resin composition is cured by heating and/or light irradiation to form an over cladding. At the time of forming the over cladding layer, a region having the over cladding and a region where the over cladding is absent and the core is exposed (i.e., a core-exposed section) can be formed by using a photolithography process.

Furthermore, the under cladding 12 having the core-neighboring region which satisfies the above (1) and (2) can be formed by the following procedure.

The under cladding 12 having the core-neighboring region which satisfies the above (1) and (2), preferably the above (1) to (3), can be formed by adjusting heating temperature and heating time and/or by adjusting irradiation intensity and irradiation time of light at the time of forming the under cladding as above. Alternatively, the under cladding 12 having the core-neighboring region which satisfies the above (1) and (2), preferably the above (1) to (3), can be formed by adding a dopant for adjusting the refractive index, adjusting it, and/or adjusting irradiation intensity and irradiation time of light.

In the case where the refractive index is adjusted by dopant addition, the refractive index depends on the material constituting the under cladding and the kind of the dopant. Therefore, the dopant is appropriately selected depending on the material constituting the under cladding to obtain the target refractive index.

For the use in a silicon photonics interface in which a silicon optical waveguide is connected to an optical fiber with low loss and at low cost, the resin optical waveguide of the present invention is preferably a single-mode optical waveguide since optical signals can be highly densified. In this case, the resin optical waveguide is preferably the single-mode optical waveguide at a wavelength of at least one of 1,310 nm and 1,550 nm since it can propagate light also to a silicon optical waveguide and a single-mode optical fiber with low loss.

In the case where the resin optical waveguide of the present invention is used in a silicon photonics interface, the resin optical waveguide is connected with the silicon optical waveguide at the core-exposed section thereof.

EXAMPLES

The following will describe the present invention in further detail with reference to Examples but the present invention should not be construed as being limited to these Examples.

In Examples described below, the structures (size and refractive index) of a resin optical waveguide and a single-mode optical fiber were defined by RSoft CAD manufactured by RSoft Design Group Inc. and simulation of light propagation was performed by BeamProp (finite difference beam propagation method) that is a simulation engine manufactured by RSoft Design Group Inc. FIG. 2 is a schematic view illustrating a connecting part between the resin optical waveguide and the single-mode optical fiber in Examples.

Examples 1 to 52

Of Examples 1 to 52, Examples 1 to 5, 7 to 11, and Examples 13 to 52 are Working Examples. Example 6 and Example 12 are Comparative Examples.

The structures of the resin optical waveguide and the single-mode optical fiber were defined by RSoft CAD as shown below.

Single-Mode Optical Fiber 400

Core 410

Core diameter: 8.4 μm

Refractive index: 1.47

Clad 420

Clad diameter: 80 μm

Refractive index: 1.4652

Resin Optical Waveguide 10

Single-Mode Optical Waveguide

Core 11

Core size: 5.9 μm in the width direction, 2.3 μm in the longitudinal direction

Refractive index: 1.534

Under cladding 12

Thickness: 40 μm

Refractive index at the interface with the core 11: 1.52

In the core-neighboring region whose distance from the core 11 is within 10 μm, there is a refractive index distribution ($0\times10^{-4}$ to $3.5\times10^{-4}$/μm) where the refractive index at the side of the interface with the core 11 is high and the refractive index decreases toward the far side from the interface with the core 11.

Over Cladding 13

Thickness: 40 μm

Refractive index: 1.52

Core-Exposed Section 14

Under a condition that the core-exposed section 14 was filled with water (refractive index: 1.32) or air (refractive index: 1.00), connection loss at a wavelength of 1.55 μm was determined through calculation by BeamProp. The results are shown in the following tables. In the tables, of the refractive index of the under cladding 12, the refractive index at the side of the interface with the core 11 is denoted as n2 and the refractive index at the position where the distance from the interface with the core 11 is 10 μm is denoted as n1. Incidentally, n2 is the maximum value $n_{max}$ of the refractive index of the under cladding 12 in the core-neighboring region and n1 is the minimum value $n_{min}$ of the refractive index of the under cladding 12 in the core-neighboring region. Moreover, offset Y between the core 11 of the optical waveguide 10 and the core 410 of the single-mode optical fiber 400 is as illustrated in FIG. 2. The index in the tables is as shown in the following table.

TABLE 1

| Index | Connection loss |
|---|---|
| 5 | 5 dB or less |
| 4 | more than 5 dB, 10 dB or less |
| 3 | more than 10 dB, 15 dB or less |
| 2 | more than 15 dB, 20 dB or less |
| 1 | more than 20 dB |

TABLE 2

| | Ex. 1 | Ex. 2 | Ex. 3 | Ex. 4 | Ex. 5 | Ex. 6 |
|---|---|---|---|---|---|---|
| Refractive index distribution ($\times10^{-4}$/μm) | 0.75 | 1.50 | 2.25 | 3.00 | 3.50 | 0.00 |
| n2 − n1 | 0.0008 | 0.0015 | 0.0023 | 0.0030 | 0.0035 | 0.0000 |
| Condition of core-exposed section | water | water | water | water | water | water |
| Connection loss (dB) | 9.0 | 5.9 | 5.1 | 4.8 | 4.7 | >30 |
| Index | 4 | 4 | 4 | 5 | 5 | 1 |

TABLE 3

| | Ex. 7 | Ex. 8 | Ex. 9 | Ex. 10 | Ex. 11 | Ex. 12 |
|---|---|---|---|---|---|---|
| Refractive index distribution ($\times10^{-4}$/μm) | 0.75 | 1.50 | 2.25 | 3.00 | 3.50 | 0.00 |
| n2 − n1 | 0.0008 | 0.0015 | 0.0023 | 0.0030 | 0.0035 | 0.0000 |
| Condition of core-exposed section | air | air | air | air | air | air |
| Connection loss (dB) | 15.3 | 9.7 | 7.1 | 6.1 | 6.0 | >30 |
| Index | 2 | 4 | 4 | 4 | 4 | 1 |

TABLE 4

| | Ex. 13 | Ex. 14 | Ex. 15 | Ex. 16 | Ex. 17 | Ex. 18 | Ex. 19 | Ex. 20 |
|---|---|---|---|---|---|---|---|---|
| Refractive index distribution ($\times10^{-4}$/μm) | 1.25 | 1.25 | 1.25 | 1.25 | 1.25 | 1.25 | 1.25 | 1.25 |
| n2 − n1 | 0.0013 | 0.0013 | 0.0013 | 0.0013 | 0.0013 | 0.0013 | 0.0013 | 0.0013 |
| Condition of core-exposed section | water | water | water | water | air | air | air | air |
| Offset Y (μm) | 0 | 2 | 4 | 6 | 0 | 2 | 4 | 6 |

TABLE 4-continued

| | Ex. 13 | Ex. 14 | Ex. 15 | Ex. 16 | Ex. 17 | Ex. 18 | Ex. 19 | Ex. 20 |
|---|---|---|---|---|---|---|---|---|
| Connection loss (dB) | 6.2 | 4.5 | 4.2 | 5.0 | 11.2 | 8.7 | 7.6 | 7.5 |
| Index | 4 | 5 | 5 | 5 | 3 | 4 | 4 | 4 |

TABLE 5

| | Ex. 21 | Ex. 22 | Ex. 23 | Ex. 24 | Ex. 25 | Ex. 26 | Ex. 27 | Ex. 28 |
|---|---|---|---|---|---|---|---|---|
| Refractive index distribution ($\times10^{-4}$/μm) | 1.75 | 1.75 | 1.75 | 1.75 | 1.75 | 1.75 | 1.75 | 1.75 |
| n2 − n1 | 0.0018 | 0.0018 | 0.0018 | 0.0018 | 0.0018 | 0.0018 | 0.0018 | 0.0018 |
| Condition of core-exposed section | water | water | water | water | air | air | air | air |
| Offset Y (μm) | 0 | 2 | 4 | 6 | 0 | 2 | 4 | 6 |
| Connection loss (dB) | 5.7 | 4.0 | 3.9 | 5.1 | 8.2 | 6.1 | 5.5 | 5.8 |
| Index | 4 | 5 | 5 | 4 | 4 | 4 | 4 | 4 |

TABLE 6

| | Ex. 29 | Ex. 30 | Ex. 31 | Ex. 32 | Ex. 33 | Ex. 34 | Ex. 35 | Ex. 36 |
|---|---|---|---|---|---|---|---|---|
| Refractive index distribution ($\times10^{-4}$/μm) | 2.50 | 2.50 | 2.50 | 2.50 | 2.50 | 2.50 | 2.50 | 2.50 |
| n2 − n1 | 0.0025 | 0.0025 | 0.0025 | 0.0025 | 0.0025 | 0.0025 | 0.0025 | 0.0025 |
| Condition of core-exposed section | water | water | water | water | air | air | air | air |
| Offset Y (μm) | 0 | 2 | 4 | 6 | 0 | 2 | 4 | 6 |
| Connection loss (dB) | 5.0 | 3.6 | 3.8 | 5.5 | 6.6 | 4.8 | 4.5 | 5.4 |
| Index | 5 | 5 | 5 | 4 | 4 | 5 | 5 | 4 |

The above Tables 1 to 6 show Examples where the length of the core-exposed section 14 in the light propagation direction was set to 2,000 μm. Table 7 and Table 8 below show results of Examples where the length of the core-exposed section 14 was set to 500 μm, 1,000 μm, 1,500 μm, or 3,000 μm.

TABLE 7

| | Ex. 37 | Ex. 38 | Ex. 39 | Ex. 40 | Ex. 41 | Ex. 42 | Ex. 43 | Ex. 44 |
|---|---|---|---|---|---|---|---|---|
| Refractive index distribution ($\times10^{-4}$/μm) | 2.50 | 2.50 | 2.50 | 2.50 | 2.50 | 2.50 | 2.50 | 2.50 |
| n2 − n1 | 0.0025 | 0.0025 | 0.0025 | 0.0025 | 0.0025 | 0.0025 | 0.0025 | 0.0025 |
| Condition of core-exposed section | air | air | air | air | air | air | air | air |
| Length of core-exposed section (μm) | 500 | 500 | 500 | 500 | 1000 | 1000 | 1000 | 1000 |
| Offset Y (μm) | 0 | 2 | 4 | 6 | 0 | 2 | 4 | 6 |
| Connection loss (dB) | 7.5 | 5.2 | 4.4 | 4.4 | 6.4 | 4.7 | 4.9 | 6.4 |
| Index | 4 | 4 | 5 | 5 | 4 | 5 | 5 | 4 |

TABLE 8

| | Ex. 45 | Ex. 46 | Ex. 47 | Ex. 48 | Ex. 49 | Ex. 50 | Ex. 51 | Ex. 52 |
|---|---|---|---|---|---|---|---|---|
| Refractive index distribution ($\times10^{-4}$/μm) | 2.50 | 2.50 | 2.50 | 2.50 | 2.50 | 2.50 | 2.50 | 2.50 |
| n2 − n1 | 0.0025 | 0.0025 | 0.0025 | 0.0025 | 0.0025 | 0.0025 | 0.0025 | 0.0025 |
| Condition of core-exposed section | air | air | air | air | air | air | air | air |
| Length of core-exposed section (μm) | 1500 | 1500 | 1500 | 1500 | 3000 | 3000 | 3000 | 3000 |
| Offset Y (μm) | 0 | 2 | 4 | 6 | 0 | 2 | 4 | 6 |
| Connection loss (dB) | 6.6 | 4.7 | 4.4 | 5.4 | 6.5 | 4.5 | 4.3 | 5.2 |
| Index | 4 | 5 | 5 | 4 | 4 | 5 | 5 | 4 |

As is apparent from Tables, connection loss was large in Examples 6 and 12 where the core-neighboring region corresponding to the core-exposed section did not have refractive index distribution. On the other hand, the connection loss was small in Examples 1 to 5, Examples 7 to 11, and Examples 13 to 52 where the refractive index distribution in the core-neighboring region corresponding to the core-exposed section was 0.00004 μm or more.

Moreover, as shown in Tables 4 to 6, in both cases of the condition that the core-exposed section 14 is filled with water and the condition that it is filled with air, when the refractive index distribution in the core-neighboring region is 0.00004 μm or more, the influence of the offset Y between the core 14 of the optical waveguide 10 and the core 410 of the single-mode optical fiber 400 is small regardless of the degree of the refractive index distribution.

Example 53, Example 54

Example 53 is Working Example and Example 54 is Comparative Example. As Example 53 was prepared a resin optical waveguide having a refractive index of the core of 1.53, a core width of 6.0 μm, a core height of 2.49 μm, a thickness of the over cladding of 24 μm, and a thickness of the under cladding of 50 μm. The under cladding has a refractive index at the core interface side being 1.516 and has such a refractive index distribution of 0.00008/μm that the refractive index decreases with the distance from the interface of the core. The under cladding has the same refractive index distribution both in the region where the over cladding is present and in the region where the over cladding is not present. The core-exposed section 14 has a length in the light propagation direction of 1,750 μm and the condition of the core-exposed section is water. The connection loss between the resin optical waveguide of Example 53 and a single-mode optical fiber was 7.0 dB and the index of the connection loss was "4".

As Example 54 was prepared an optical fiber having the same structure as in Example 53 except that the refractive index of the under cladding was set constant along the thickness direction. The refractive index of the under cladding is 1.516 and constant. The connection loss between the resin optical waveguide of Example 54 and a single-mode optical fiber was more than 20 dB and the index of the connection loss was "1".

The present invention is described in detail with reference to specific embodiments, but it is apparent for those skilled in the art that various changes or modifications can be added without departing from the spirit and the scope of the present invention. This application is based upon Japanese Patent Application (No. 2015-154011), filed on Aug. 4, 2015, the contents of which are incorporated herein by reference.

DESCRIPTION OF REFERENCE NUMERALS AND SIGNS

10: Resin optical waveguide
11: Core
12: Under cladding
13: Over cladding
14: Core-exposed section
100: Connector
200: Silicon optical waveguide chip
210: Silicon optical waveguide
220: Core
230: Coating
300: Resin optical waveguide chip
310: Resin optical waveguide
320: Core
330: Under cladding
340: Over cladding
350: Core-exposed section
400: Single-mode optical fiber

The invention claimed is:

1. A resin optical waveguide comprising a core, an under cladding and an over cladding having refractive indices lower than that of the core, wherein the resin optical waveguide comprises, at one end side thereof, a core-exposed section at which the over cladding is not present and the core and the under cladding adjacent to the core are exposed and, of the under cladding, a portion corresponding to the core-exposed section comprises a core-neighboring region that satisfies the following (1) and (2):

(1) the core-neighboring region is a region whose distance from the core is within x, and x is 5 μm or more and 20 μm or less; and (2) the core-neighboring region has a refractive index distribution that a refractive index at a side of an interface with the core is high and the refractive index at a far side from the interface with the core is low.

2. The resin optical waveguide according to claim 1, wherein the core-exposed section has a length of 100 μm or more in a light propagation direction.

3. The resin optical waveguide according to claim 1, wherein the refractive index distribution in the core-neighboring region is 0.00004/μm or more.

4. The resin optical waveguide according to claim 1, having a difference ($n_{max}-n_{min}$) between a maximum value $n_{max}$ and a minimum value $n_{min}$ of the refractive index of the under cladding in the core-neighboring region being 0.0001 or more.

5. The resin optical waveguide according to claim 1, having a difference ($n'_{max}-n_{max}$) between a maximum value $n'_{max}$ of a refractive index of the core and a maximum value $n_{max}$ of the refractive index of the under cladding in the core-neighboring region being from 0.008 to 0.02.

6. The resin optical waveguide according to claim 1, wherein, of the portion of the under cladding corresponding to the core-exposed section, a portion other than the core-neighboring region has a refractive index being equal to or less than a minimum value $n_{min}$ of the refractive index of the under cladding in the core-neighboring region.

7. The resin optical waveguide according to claim 1, wherein the resin optical waveguide is a single-mode optical waveguide at a wavelength of at least one of 1,310 nm and 1,550 nm.

8. The resin optical waveguide according to claim 1, wherein the resin optical waveguide has a core size of from 1 to 10 μm.

9. The resin optical waveguide according to claim 1, wherein the core of the resin optical waveguide is composed of a resin containing fluorine.

10. A resin optical waveguide comprising a core, an under cladding having a refractive index lower than that of the core, and an over cladding, wherein the resin optical waveguide comprises, at one end side thereof, a core-exposed section at which the over cladding is not present and the core and the under cladding adjacent to the core are exposed, and the core-exposed section has a length of 500 μm or more in a light propagation direction of the resin optical waveguide, and of the under cladding, a portion corresponding to the core-exposed section has a core-neighboring region that satisfies the following (1) to (3):

(1) the core-neighboring region is a region whose distance from the core is within x, and x is 10 μm or more and 20 μm or less;

(2) the core-neighboring region has a refractive index distribution that a refractive index at a side of an interface with the core is high and the refractive index at a far side from the interface with the core is low; and (3) a difference ($n_{max}-n_{min}$) between a maximum value $n_{max}$ and a minimum value $n_{min}$ of the refractive index of the under cladding in the core-neighboring region is 0.001 or more.

11. A silicon photonics interface comprising the resin optical waveguide according to claim 1 and a silicon optical waveguide, wherein the resin optical waveguide is connected with the silicon optical waveguide at the core-exposed section.

12. A silicon photonics interface comprising the resin optical waveguide according to claim 10, and a silicon optical waveguide, wherein the resin optical waveguide is connected with the silicon optical waveguide at the core-exposed section.

* * * * *